(12) United States Patent
Esler et al.

(10) Patent No.: US 9,378,595 B2
(45) Date of Patent: Jun. 28, 2016

(54) INSTANTANEOUS STATUS TO TARGET GAUGE FOR VEHICLE APPLICATION

(71) Applicant: Ford Global Technologies, LLC, Dearborn, MI (US)

(72) Inventors: Craig Edward Esler, Plymouth, MI (US); Dale Gilman, Beverly Hills, MI (US); Yevgeniya Sosonkina, Birmingham, MI (US); Ryan J. Skaff, Farmington Hills, MI (US); Jason Meyer, Canton, MI (US); Paul Aldighieri, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 14/473,140

(22) Filed: Aug. 29, 2014

(65) Prior Publication Data

US 2016/0063772 A1 Mar. 3, 2016

(51) Int. Cl.
*G07C 5/00* (2006.01)
*B60K 35/00* (2006.01)
*G06F 3/0481* (2013.01)
*B60R 16/023* (2006.01)

(52) U.S. Cl.
CPC ............... *G07C 5/004* (2013.01); *B60K 35/00* (2013.01); *G06F 3/04817* (2013.01); *B60K 2350/1092* (2013.01); *B60R 16/0236* (2013.01)

(58) Field of Classification Search
CPC ............. G07C 5/004; B60K 35/00; B60K 2350/1092; G06F 3/04817
USPC .............................................. 701/1, 22, 123
See application file for complete search history.

(56) References Cited

U.S. PATENT DOCUMENTS

| | | | | |
|---|---|---|---|---|
| 6,453,731 B1 * | 9/2002 | Yaegashi | ................ | B60K 35/00 73/114.52 |
| 6,480,106 B1 * | 11/2002 | Crombez | ............ | B60R 16/0232 340/438 |
| 6,961,656 B2 | 11/2005 | Kim | | |
| 7,237,203 B1 | 6/2007 | Kuenzner | | |
| 8,228,180 B2 | 7/2012 | Levy et al. | | |
| 8,477,022 B2 * | 7/2013 | Taguchi | ................. | B60K 35/00 340/438 |
| 8,666,576 B2 | 3/2014 | Kim | | |
| 8,874,344 B2 * | 10/2014 | Aldighieri | ................ | B60T 1/10 116/28 R |
| 8,907,811 B2 * | 12/2014 | Windstrup | ............ | B60L 11/184 236/94 |
| 9,139,095 B2 * | 9/2015 | Kim | ........................ | B60L 1/003 |
| 2005/0128065 A1 * | 6/2005 | Kolpasky | ................ | G09F 21/04 340/461 |
| 2005/0278079 A1 * | 12/2005 | Maguire | ............... | G07C 5/0858 701/1 |
| 2010/0207755 A1 * | 8/2010 | Watson | ................. | B60K 35/00 340/450.2 |
| 2012/0035843 A1 | 2/2012 | Miura et al. | | |

(Continued)

*Primary Examiner* — Thomas Tarcza
*Assistant Examiner* — Tyler J Lee
(74) *Attorney, Agent, or Firm* — David Kelley; Brooks Kushman P.C.

(57) ABSTRACT

A vehicle includes a display and a controller that operates the display. A first icon representing a reference energy consumption value based on a predetermined target energy consumption rate is displayed. A second icon representing a present energy consumption value is displayed. The icons are positioned relative to one another based on a difference between the reference energy consumption value and the present energy consumption value. A numerical scale may be displayed having values associated with the first and second icons. A vehicle having a hybrid powertrain including a traction battery may display an effective electric distance traveled that is based on a ratio of power supplied by the traction battery to total power supplied by the powertrain.

20 Claims, 3 Drawing Sheets

(56) References Cited

U.S. PATENT DOCUMENTS

| | | | |
|---|---|---|---|
| 2012/0116606 A1* | 5/2012 | Ichinokawa | B60K 35/00 701/1 |
| 2012/0179420 A1 | 7/2012 | Gilman et al. | |
| 2013/0253740 A1* | 9/2013 | Kim | B60L 1/003 701/22 |
| 2014/0077941 A1* | 3/2014 | Yamamura | B60K 35/00 340/438 |

* cited by examiner

INSTANTANEOUS STATUS TO TARGET GAUGE FOR VEHICLE APPLICATION

TECHNICAL FIELD

This application is generally related to vehicle gauges and displays for energy consumption of a vehicle.

BACKGROUND

A vehicle display provides information and feedback to the operator regarding operation of the vehicle. For example, in vehicles including an internal combustion engine, a fuel gauge indicates an amount of fuel remaining in a fuel tank. This provides valuable information to an operator to indicate when more fuel should be added to the fuel tank. Other information, such as average fuel economy or instantaneous fuel economy, may also be displayed.

An information display unit for a vehicle that includes a traction battery and an electric machine may display information regarding the state of a traction battery. Information such as battery state of charge and a distance until zero state of charge may be displayed. A display unit for a hybrid-electric vehicle that includes an engine may display information related to the engine along with information related to the traction battery.

SUMMARY

A vehicle includes a display and at least one controller. The controller is programmed to operate the display according to a reference energy consumption value based on a predetermined target energy consumption rate and a present energy consumption value such that a position of a first icon relative to a position of a second icon is based on a difference between the reference energy consumption value and the present energy consumption value. The controller may be further programmed to display a first numerical value associated with the first icon and a second numerical value associated with the second icon, wherein the first numerical value corresponds to the reference energy consumption value and the second numerical value corresponds to the present energy consumption value. The present energy consumption value may be based on a time averaged energy consumption rate. The present energy consumption value may be based on a distance averaged energy consumption rate. The present energy consumption value may be based on a distance traveled during an ignition cycle. The present energy consumption value may be based on a present amount of energy remaining in a traction battery. The present energy consumption may be based on an amount of energy that a traction battery is capable of storing at full charge. The present energy consumption value may be a distance remaining to fully discharge a traction battery. The present energy consumption value may be a predicted distance traveled if a traction battery is fully charged and energy is used at a present actual energy consumption rate. The present energy consumption value may be based on a ratio of power supplied by a traction battery to total power supplied by the vehicle A method for displaying vehicle energy consumption on a display includes displaying a first icon associated with a reference energy consumption value based on a predetermined target energy consumption rate. The method also includes displaying, at a position relative to the first icon by a distance that is based on a difference between a present energy consumption value and the reference energy consumption value, a second icon associated with the present energy consumption value. The method may further comprise displaying a first numerical value associated with the first icon and a second numerical value associated with the second icon, wherein the first numerical value corresponds to the reference energy consumption value and the second numerical value corresponds to the present energy consumption value. The method may further comprise displaying a scale corresponding to a range of values for energy consumption, wherein the first icon is positioned adjacent the scale at a position corresponding to the reference energy consumption value and the second icon is positioned adjacent the scale at a position corresponding to the present energy consumption value. The present energy consumption value may be based on a ratio of power supplied by a traction battery to total power supplied by a vehicle. The present energy consumption value may be based on a distance averaged energy consumption rate. The present energy consumption value may be a distance remaining to fully discharge a traction battery. The present energy consumption value may be a predicted distance traveled if a traction battery is fully charged and energy is used at a present actual energy consumption rate.

A vehicle includes a powertrain including a traction battery, a display, and at least one controller programmed to operate the display to indicate an effective electric distance traveled that is based on a ratio of power supplied by the traction battery to total power supplied by the powertrain. The powertrain may include an internal combustion engine and total power supplied by the powertrain may include power supplied by the internal combustion engine. The at least one controller may be further programmed to operate the display to indicate a reference electric distance traveled that is based on a predetermined target energy consumption rate. The at least one controller may be further programmed to operate the display such that a position of a first icon, representing the effective electric distance traveled, relative to a position of a second icon, representing the reference electric distance traveled, is based on a difference between the reference electric distance traveled and the effective electric distance traveled.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
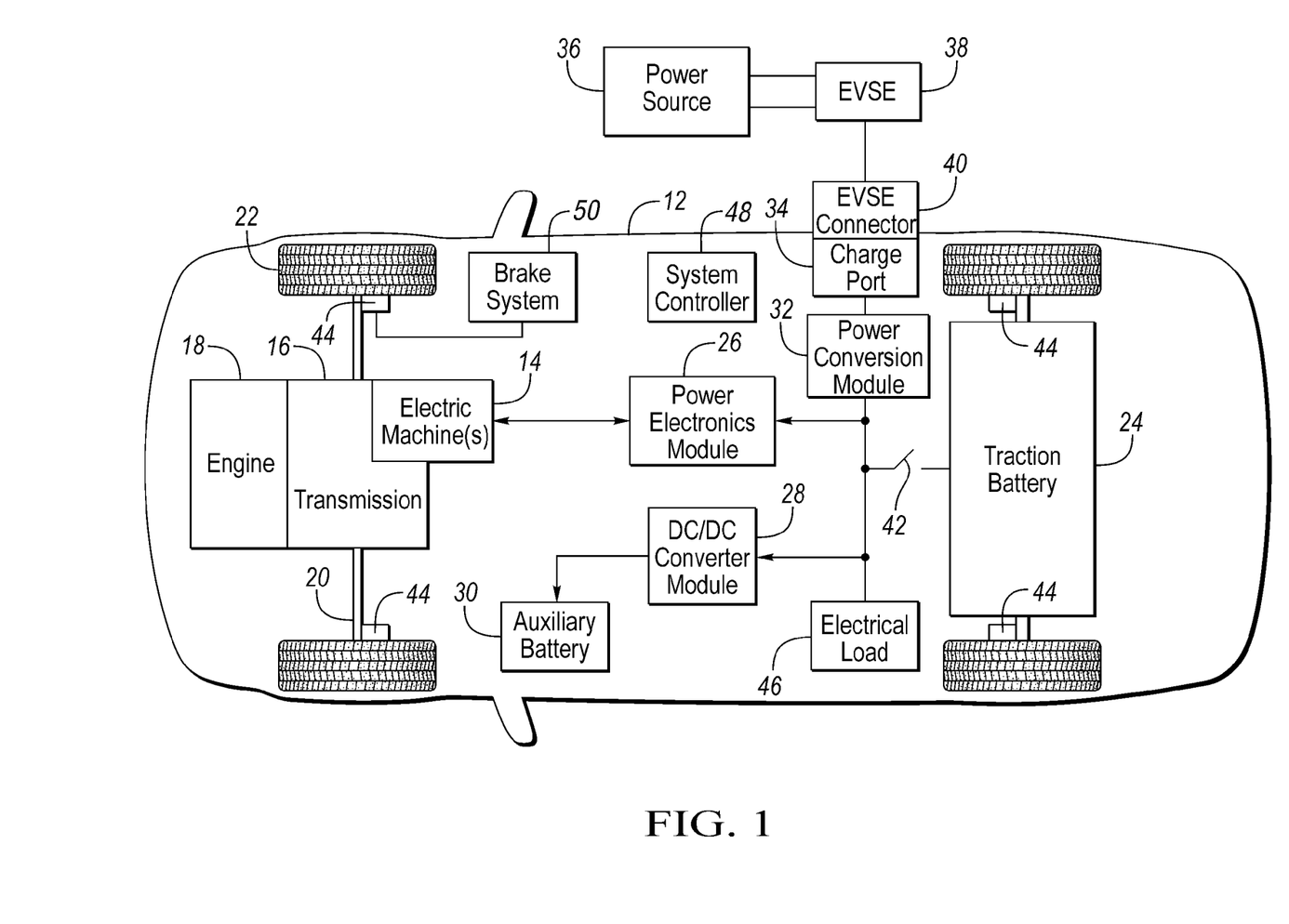
FIG. 1 is a diagram of a hybrid vehicle illustrating typical drivetrain and energy storage components.

FIG. 1 depicts a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high voltage DC output. The traction battery 24 is electrically connected to one or more power electronics modules. One or more contactors (not shown) may isolate the traction battery 24 from other components when opened and connect the traction battery 24 to other components when closed. The power electronics module 26 is also electrically connected to the electric machines 14 and provides the ability to bi-directionally transfer energy between the traction battery 24 and the electric machines 14. For example, a typical traction battery 24 may provide a DC voltage while the electric machines 14 may require a three-phase AC current to function. The power electronics module 26 may convert the DC voltage to a three-phase AC current as required by the electric machines 14. In a regenerative mode, the power electronics module 26 may convert the three-phase AC current from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. The low-voltage systems may be electrically connected to an auxiliary battery 30 (e.g., 12V battery).

The vehicle 12 may be an electric vehicle or a plug-in hybrid vehicle in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

The various components discussed may have one or more associated controllers to control and monitor the operation of the components. The controllers may communicate via a serial bus (e.g., Controller Area Network (CAN)) or via discrete conductors. In addition, a system controller 48 may be present to coordinate the operation of the various components.

Figure 2:
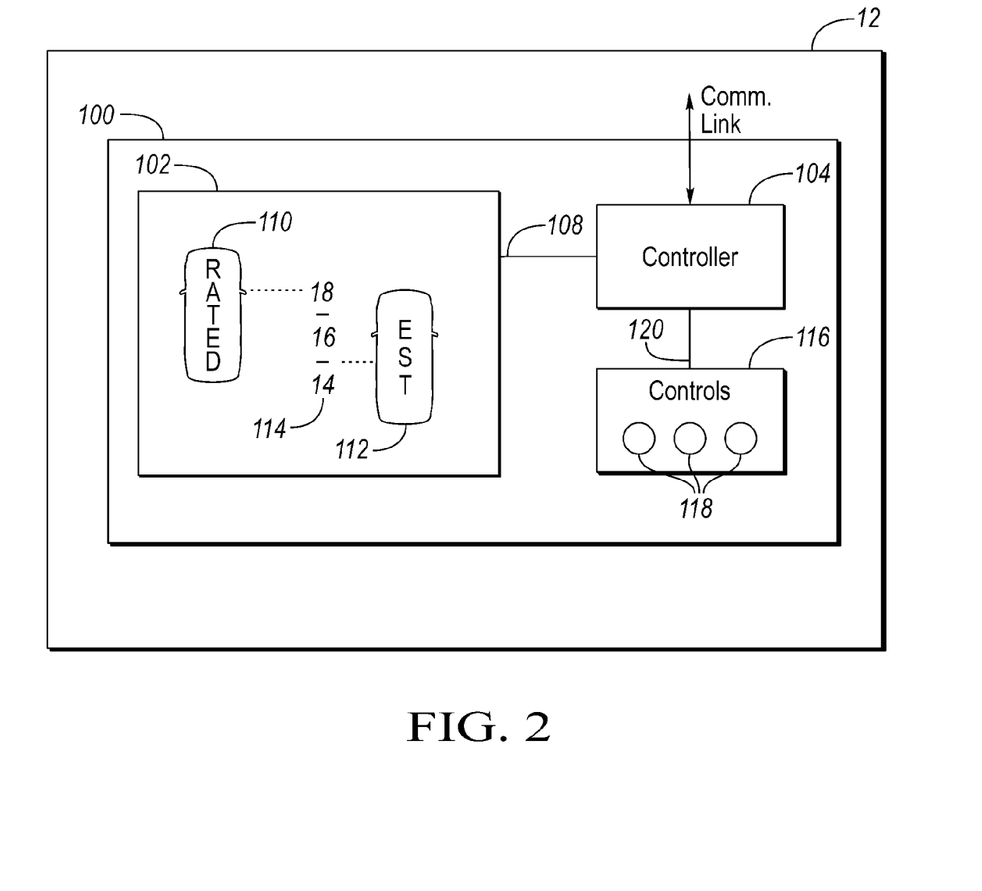
FIG. 2 is a diagram of an information display system within a vehicle.

FIG. 2 depicts an information display system 100 that may be included in the vehicle 12 for providing feedback to an operator. The information display system 100 may include a display 102 located in a dashboard of the vehicle 12 in a convenient position for viewing by the operator. The information display system 100 may include an associated display controller 104 that controls and operates the display 102 via a discrete or serial interface 108. The display controller 104 may interface with one or more other vehicle controllers to receive data to be displayed over a communications link. An operator controls interface 116 may be included and may include one or more buttons or switches 118. The operator controls interface 116 may communicate with the display controller 104 via a serial or discrete interface 120.

Conventional vehicles driven with an internal combustion engine display a fuel level indication. The fuel level indication provides feedback to the operator as to the amount of fuel remaining. Such an indication helps to ensure that the operator does not deplete the remaining fuel at an unexpected location. With the introduction of hybrid and electric vehicles, drivers may desire more feedback regarding efficiency and energy consumption. It is desirable to provide feedback to the operator to help achieve efficiency and energy consumption goals of the operator.

Typical feedback also includes an odometer reading that indicates the total distance traveled by the vehicle 12. In addition, one or more resettable trip odometers may be present to indicate the distance traveled for a particular trip. The trip odometers generally count up the distance traveled from zero after a reset. The operator may initiate the reset by operating a switch or button 118. The odometer and trip odometers may provide signals to the display controller 104.

An electric vehicle depends solely on the traction battery 24 to provide energy for propulsion. Information regarding the amount of energy stored in the traction battery 24 and an expected range of the vehicle 12 may be desired by the operator. The expected range may be a distance to empty (DTE) indication which is a distance that the vehicle 12 may be expected to travel based on a present state of charge of the traction battery 24.

The vehicle 12 may display information regarding fuel economy. An indication of instantaneous fuel economy may be displayed. The instantaneous fuel economy may be in units of miles per gallon and may be calculated over a predetermined time period. An average fuel economy may be displayed that indicates the vehicle fuel economy over a longer period of time. The average fuel economy may be resettable.

A vehicle buyer may purchase a hybrid or electric vehicle based on fuel and energy efficiency. The buyer or of these vehicles may prefer feedback that may help them drive in a more energy efficient manner. For example, displays of instantaneous fuel economy may help the operator to adjust operation of the vehicle based on the displayed feedback. For an electric vehicle, the display may include remaining range that is a distance until the battery is fully discharged. The display may also include an instantaneous energy consumption value.

The display 102 may be a Liquid Crystal Display (LCD) screen having a number of pixels. The display 102 may be capable of displaying in monochrome or in color. The display 102 may not be limited to displaying numerical quantities, but may display graphical figures as well. A displayed quantity may be associated with a graphical figure or icon to better convey what the information relates to.

The information display system 100 may be configured to display information related to vehicle performance measures. Displayed information may include various fuel and energy consumption measures. The display 102 may be operated to display a numerical value corresponding to the vehicle performance measures in digital form and/or indicate the value on a scale or range of values. A classic example of a vehicle performance measure display may be a speedometer which indicates the vehicle speed. A needle may point to a value on a gauge to indicate the present value of the performance measure (e.g., vehicle speed).

Although the present value of the vehicle performance measure is useful information, an operator may desire to compare the performance relative to a target value. For example, when a vehicle 12 is manufactured for sale, a window label or sticker is applied to indicate important information about the vehicle. Governmental agency regulations (e.g., U.S. Environmental Protection Agency (EPA)) may require that certain information be listed on the window label. Information on the window label may include fuel and energy consumption ratings. For example, vehicles including a gasoline engine list city and highway fuel economy values in miles per gallon (mpg) on the label. Plug-in hybrid and electric vehicles list an energy consumption rate in kilowatt-hours per 100 miles (kW-hr/100 mi) and a driving range that is the distance the vehicle can travel on a full battery charge. Such information gives vehicle buyers useful information for comparing the performance of different vehicles.

In addition, vehicle manufacturers may advertise the vehicle 12 using various consumption ratings or targets. The operator may desire to know how the vehicle 12 is performing relative to these advertised or label ratings. The information display system 100 may be configured to display a target or reference value along with the actual performance measure. This may allow the operator to readily compare the present vehicle performance to the target value. Additionally, displaying a reference value provides a target for the operator to achieve or surpass.

A variety of energy consumption measures may be displayed. The energy consumption values displayed may provide information related to energy consumption of the vehicle. The displayed values may be indicative of how energy is being consumed and how much energy remains to be used. The energy consumption values displayed may include a rate of energy consumption and an amount of energy consumed. An energy consumption rate may be an energy consumption that is time averaged or distance averaged (dependent upon the consumption target). The time or distance over which the energy consumption is averaged may be a calibrateable value. For example, the energy consumption rate may be the actual energy consumption over a distance in units of Wh/km. The actual energy consumption rate may be displayed along with a reference value that is the rated energy consumption rate from the label. A trip based comparison of the actual energy consumption rate (Wh/km) may be displayed in which a new trip is initiated at each ignition cycle. The actual and rated energy consumption rates for the present trip or ignition cycle may be displayed.

A scale 114 may be displayed with a range of selected energy consumption values. The actual energy consumption value and the rated energy consumption value may be displayed on or adjacent the scale 114. The displayed scale 114 may be a portion of a complete range of possible values. The displayed scale values 114 may change as the actual and rated energy consumption values change over time.

The energy consumption value displayed may be an estimate of remaining electric range. This may be referred to as a distance to empty (DTE) estimate. The rated energy consumption value may be a range remaining that is based on the rated energy consumption rate from the label. The remaining electric range may be calculated based on an amount of energy remaining in the traction battery and a present energy usage rate. The present energy usage rate may be an average energy usage rate over a predetermined time period. The DTE estimate value may be averaged in the time or distance domains. The time or distance over which the energy consumption value is averaged may be calibrateable.

The energy consumption value displayed may be a range per full charge (RPFC) estimate. The rated energy consumption value may be a range per full charge value from the label. A trip based energy consumption value of range per full charge may be used in which a new trip is initiated at each ignition cycle. The RPFC may be based on a present energy consumption rate.

The energy consumption value displayed may be an actual distance traveled. The distance traveled may be defined over a single trip, an ignition cycle, or some predetermined starting point. The rated energy consumption value may be a reference distance traveled that is based on the rated energy consumption rate from the label.

The energy consumption values to be displayed may be based on the total energy consumption of the vehicle 12. A number, N, of factors or systems that consume energy may be present on the vehicle 12. The total energy consumption may be determined by monitoring the energy consumption of each of the individual energy consumers, such as the electric machines 14 and the DC/DC converter module 28, and summing the results. The energy consumption rate of the vehicle 12 may be determined using the total energy consumption and the time or distance. The distance may be predicted or estimated.

Energy consumption values may be time averaged. An average power consumption value (in Watts) for the vehicle 12 may be calculated. The average power may be calculated as:

$$p_{i,avg}(k) = (1-\alpha)p_{i,avg}(k-1) + \alpha * p_i(k)$$

where $p_{i,avg}$ is the average power consumed for the $i^{th}$ factor (in Watts), $p_i$ is the instantaneous power consumed for $i^{th}$ factor (in Watts), k is a discrete time index, and a is a filter constant. The average power may be determined for each of the N factors. The instantaneous power consumed by an electrical load may be computed as a product of a voltage and a current. The filter constant determines how quickly the average power value responds to changes in the instantaneous power consumed. Alternatively, the average power may be calculated by summing N power values and dividing the sum by N. An average vehicle speed (in kph) may be determined in a similar manner.

A time averaged energy consumption rate for the different factors (in Watt-hours per kilometer) may be calculated as:

$$r_{i,avg,time} = p_{i,avg}/v_{avg}$$

where $r_{i,avg}$ is the average energy consumption rate due to the $i^{th}$ factor (Whr/km) and $v_{avg}$ is the average vehicle speed (km/hr).

The total vehicle energy consumption rate may be calculated as the sum of the average energy consumption rate due to each of the systems considered as follows:

$$r_{total,time} = \sum_{1}^{N} r_{i,avg,time}$$

The total energy consumption may be determined as the product of the total vehicle energy consumption rate and the distance traveled.

The energy consumption values may also be determined on a per trip basis or averaged over distance. The cumulative energy consumed may be recorded over the trip and a distance traveled for the current trip may be calculated. The cumulative energy consumed may be expressed as:

$$e_{i,trip}(k) = e_{i,trip}(k-1) + \Delta t * p_i(k)$$

where $e_{i,trip}$ is the energy consumed during the current trip for the $i^{th}$ factor (Whr) and $\Delta t$ is the calculation loop time (hr). A typical calculation loop time may be 100 milliseconds. The total energy consumption may be obtained by summing the energy consumed by each of the factors. The distance of the current trip may be calculated as:

$$d_{trip}(k) = d_{trip}(k-1) + \Delta t * v(k)$$

where $d_{trip}$ is the trip distance (km) and v is the vehicle speed (km/hr).

The distance averaged energy consumption rate for the $i^{th}$ factor may be calculated as:

$$r_{i,avg,trip} = e_{i,trip}/d_{trip}$$

The distance averaged total vehicle energy consumption rate may be calculated as the sum of the distance averaged energy consumption rates for each of the factors considered as follows:

$$r_{total,trip} = \sum_{1}^{N} r_{i,avg,trip}$$

The per trip energy consumption may be reset by setting the $e_{i,trip}(k-1)$ values to zero. This may be performed at each ignition cycle or may be performed by operator action (e.g., switch or button operation). The average or instantaneous energy consumption rate may be displayed along with the target energy consumption rate from the vehicle label. The controller 104 may store the trip based energy consumption rate values in non-volatile memory for later display and comparison.

An expected DTE based on the present amount of energy stored in the traction battery may be computed and displayed. The expected DTE may be calculated based on the average total energy consumption rate as:

$$DTE_e = E_{batt}/r_{total,x}$$

where $DTE_e$ is the predicted electric distance to empty (km), $E_{batt}$ is the present energy available (Whr) from the traction battery and $r_{total,x}$ is the energy consumption rate averaged over time or distance. The expected DTE based on a reference energy consumption rate may be calculated as $$DTE_{e,ref} = E_{batt}/r_{avg,ref}$$

where $DTE_{e,ref}$ is the predicted reference distance to empty (km) and $r_{avg,ref}$ is a reference average energy consumption rate (Whr/km). The reference average energy consumption rate may be derived from the window label. For example, an EPA window label for an electric vehicle may provide an estimate of the energy consumption rate in kW-hrs/100 mi which may be converted to Whr/km. This EPA window label energy consumption rate may be used as the target energy consumption rate.

The DTE based on the present amount of energy stored in the traction battery yields a value that decreases as the battery energy is used. The behavior is similar to that of a fuel gauge. Over time, this value may count down toward zero. Both the instantaneous value and the reference value may decrease toward zero over time.

An expected DTE based on a fully charged traction battery (also referred to as RPFC) may also be computed. An expected DTE for the fully charged battery may be calculated based on the average total energy consumption rate as:

$$DTE_{e,fullcharge} = E_{batt,fullcharge}/r_{total,x}$$

where $DTE_{e,fullcharge}$ is the predicted electric range for a fully charged battery (km) and $E_{batt,fullcharge}$ is the energy stored in a fully charged battery (Whr). The expected distance of a fully charged battery based on a reference energy consumption rate may be calculated as:

$$DTE_{e,ref,fullcharge} = E_{batt,fullcharge}/r_{avg,ref}$$

where $DTE_{e,ref,fullcharge}$ is the predicted reference electric range for a fully charged battery (km), $r_{avg,ref}$ is the reference average energy consumption rate (Whr/km). Alternatively, the reference value may be the EPA label value for estimated distance traveled on a full charge.

The DTE based on a full battery charge yields a value that may remain within a range over time based on the present energy usage from the battery. The reference value may remain constant over time with the present value changing relative to the reference. The display may indicate an operator's performance relative to the target distance.

The information display system 100 may display the target and present energy consumption values in the form of a distance traveled race. A distance prediction for the vehicle 12 operating with the actual energy consumption rate may be compared to a reference vehicle operating with a reference energy consumption rate. The reference energy consumption rate may be determined as a target value corresponding to the vehicle label. The distance predictions may count down toward zero to indicate an expected distance remaining. Alternatively, the distances may be counted up to indicate a total distance traveled. The distance of the reference may indicate a distance that would have been traveled if the trip energy were consumed at the reference energy consumption rate.

An effective electric distance traveled or electric only DTE estimate may also be computed for a hybrid-electric vehicle. The fractional energy derived from the battery may be calculated as:

$$E_{fraction} = p_{elec}/(p_{elec} + c_{fuel} * \eta_{comb} * q_{fuel})$$

where $E_{fraction}$ is the fraction of energy from the battery, $p_{elec}$ is the electric battery power (W), $c_{fuel}$ is the fuel energy density (J/L), $\eta_{comb}$ is the combustion efficiency and $q_{fuel}$ is the volumetric flow rate (L/s). Note that for an electric only vehicle the $E_{fraction}$ is one since all energy is provided by the traction battery. Other examples may include a fuel cell vehicle in which the denominator is modified to reflect the energy provided by the fuel cell source.

An effective electric distance traveled for the trip may be recorded as:

$$d_{elec,trip}(k)=d_{elec,trip}(k-1)+\Delta t*v(k)*E_{fraction}(k)$$

where $d_{elec,trip}$ is the effective trip electric distance traveled (km).

The cumulative electric energy consumed is:

$$e_{elec,trip}(k)=e_{elec,trip}(k-1)+\Delta t*p_{elec}(k)$$

where $e_{elec,trip}$ is the electric energy consumed for the trip (Whr).

The reference electric distance traveled is:

$$d_{elec,ref}=e_{elec,trip}/r_{avg,ref}$$

The effective electric distance traveled provides an indication of the amount of the energy that is provided from the traction battery. The reference electric distance traveled indicates the electric distance that would be expected based on the label or rated consumption rate. An operator may compare the effective and reference electric distances to evaluate the performance.

The display 102 may be operated to indicate the vehicle performance measure in relation to a calibrateable target value for the vehicle performance measure. For example, actual energy consumption and the label energy consumption may be displayed. The label energy consumption may be an energy consumption depicted on a label that contains information about the vehicle prior to sale. The label energy consumption may be considered to be the target value. A graphical representation of consumption may be displayed compared to the target value.

A graphical representation may be provided to display the actual and target quantities. One representation may be to display the values along with an icon or graphical depiction of an automobile. A scale 114 having appropriate values for the energy consumption quantities to be displayed may be positioned on the display 102. For example, in a DTE mode, the scale 114 may display numbers representing miles or kilometers that remain until the battery is depleted. A first automobile icon 110 may represent the target or rated value. The first automobile icon 110 may have a value associated with it that is the target value displayed as a numerical number. A second automobile icon 112 may represent the actual or present value of the performance measure. The second automobile icon 112 may have a value associated with it that is the present value of the performance measure (e.g., DTE). The first automobile icon 110 may remain in a fixed location on the display 102. The position of the second automobile icon 112 relative to the first automobile icon 110 may vary as the actual value of the performance measure changes. The relative position of the second automobile icon 112 to the first automobile icon 110 may be based on the difference between the target value and the present value of the performance measure.

Such a graphical representation may resemble a "chase" on the display. The second automobile icon 112 may appear to move in relation to the first automobile icon 110. The driver is provided with feedback regarding the present driving performance. The driver may change their driving style to cause the second automobile icon 112 to move relative to the first automobile icon 110. The display 102 provides instant feedback as to how the driver is performing with respect to the chosen energy performance measure. The display may encourage a driver to modify their driving style to attempt to "catch" up with the target automobile icon 110. The driver may be motivated to match performance of the target.

Figure 3:
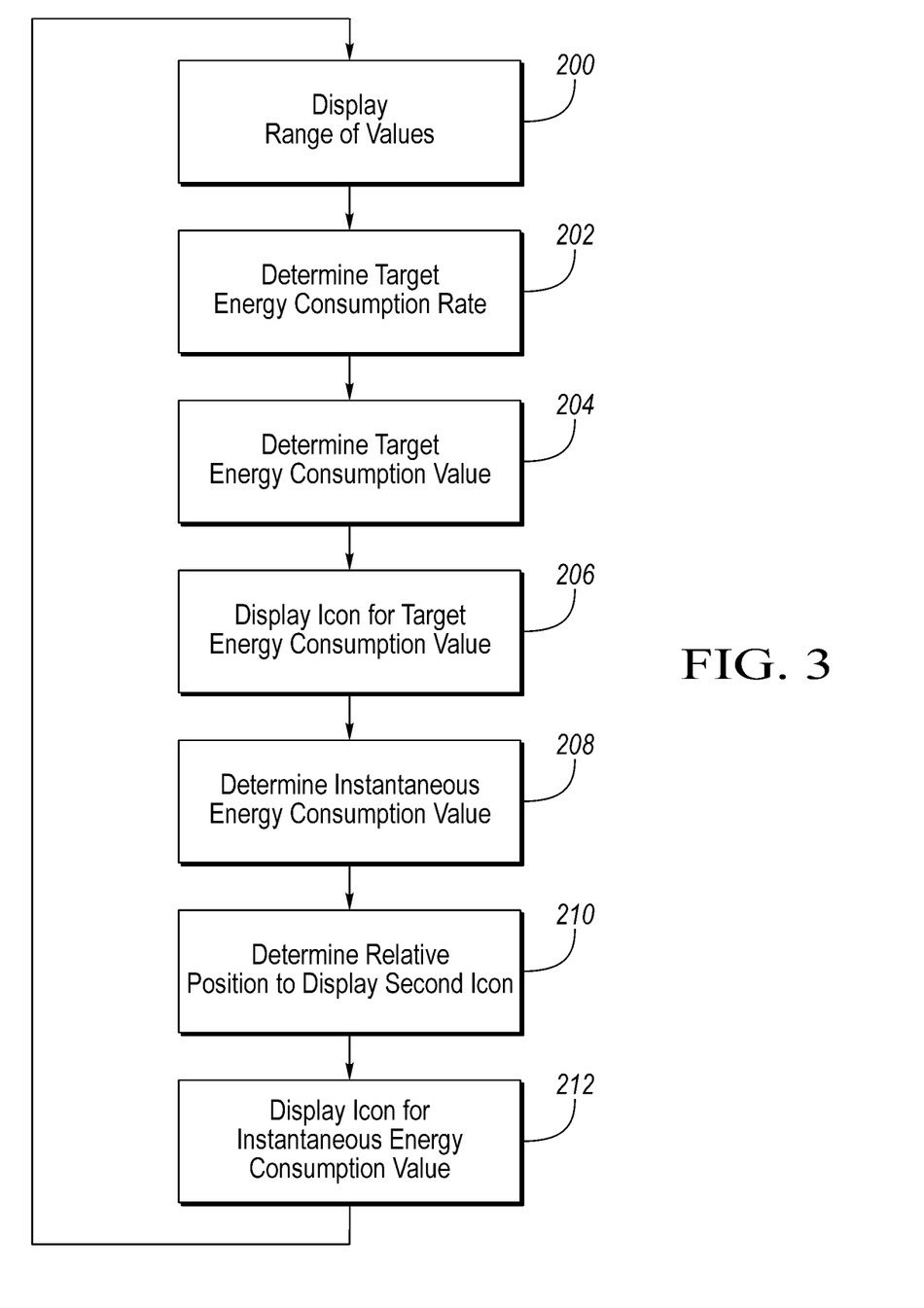
FIG. 3 is a flowchart depicting possible operations for displaying energy consumption values.

FIG. 3 depicts a flowchart that may be implemented in a controller 104. Operation 200 may display the range of values appropriate for the chosen energy consumption measure. Operation 202 may calculate the target energy consumption rate. The target energy consumption rate may be stored in a table within the controller. Operation 204 may calculate the target energy consumption value based on the target energy consumption rate. Operation 206 may cause an icon to be displayed for the target energy consumption value.

Operation 208 may calculate the instantaneous or present energy consumption value. The present energy consumption value may depend on the type of energy consumption measure to be displayed. Operation 210 may determine the position at which to display the icon associated with the present energy consumption value. The position may be relative to the icon associated with the target energy consumption value. The distance between the icons may be based on the difference between the target energy consumption value and the present energy consumption value. Operation 212 may cause the icon associated with the instantaneous energy consumption value to be displayed on the display 102. The system is not limited to the particular order of operations as described and different sequencing of the operations is possible.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a display; and
at least one controller programmed to operate the display such that a position of a first icon, representing vehicle performance at a reference energy consumption value based on a predetermined target energy consumption rate, relative to a position of a second icon, representing vehicle performance at a present energy consumption value, is based on a difference between the reference energy consumption value and the present energy consumption value.

2. The vehicle of claim 1 wherein the at least one controller is further programmed to display a first numerical value associated with the first icon and a second numerical value associated with the second icon, wherein the first numerical value corresponds to the reference energy consumption value and the second numerical value corresponds to the present energy consumption value.

3. The vehicle of claim 1 wherein the present energy consumption value is based on a time averaged energy consumption rate.

4. The vehicle of claim 1 wherein the present energy consumption value is based on a distance averaged energy consumption rate.

5. The vehicle of claim 1 wherein the present energy consumption value is based on a distance traveled during an ignition cycle.

6. The vehicle of claim 1 wherein the present energy consumption value is based on a present amount of energy remaining in a traction battery.

7. The vehicle of claim 1 wherein the present energy consumption is based on an amount of energy that a traction battery is capable of storing at full charge.

8. The vehicle of claim 1 wherein the present energy consumption value is a distance remaining to fully discharge a traction battery.

9. The vehicle of claim 1 wherein the present energy consumption value is a predicted distance traveled if a traction battery is fully charged and energy is used at a present actual energy consumption rate.

10. A method for displaying vehicle energy consumption on a display comprising:
displaying a first icon associated with a reference energy consumption value that is based on a predetermined target energy consumption rate; and
displaying, at a position relative to the first icon by a distance that is based on a difference between a present energy consumption value and the reference energy consumption value, a second icon associated with the present energy consumption value.

11. The method of claim 10 further comprising displaying a first numerical value associated with the first icon and a second numerical value associated with the second icon, wherein the first numerical value corresponds to the reference energy consumption value and the second numerical value corresponds to the present energy consumption value.

12. The method of claim 10 further comprising displaying a scale corresponding to a range of values for energy consumption, wherein the first icon is positioned adjacent the scale at a position corresponding to the reference energy consumption value and the second icon is positioned adjacent the scale at a position corresponding to the present energy consumption value.

13. The method of claim 10 wherein the present energy consumption value is based on a ratio of power supplied by a traction battery to total power supplied by a vehicle.

14. The method of claim 10 wherein the present energy consumption value is based on a distance averaged energy consumption rate.

15. The method of claim 10 wherein the present energy consumption value is a distance remaining to fully discharge a traction battery.

16. The method of claim 10 wherein the present energy consumption value is a predicted distance traveled if a traction battery is fully charged and energy is used at a present energy consumption rate.

17. A vehicle comprising:
a powertrain including a traction battery;
a display including an indicator representing an effective electric distance traveled; and
at least one controller programmed to operate the display such that a value indicated by the indicator changes at a rate that is defined by a product of vehicle speed and a ratio of power supplied by the traction battery to total power supplied by the powertrain.

18. The vehicle of claim 17 wherein the powertrain includes an internal combustion engine, and wherein total power supplied by the powertrain includes power supplied by the internal combustion engine.

19. The vehicle of claim 17 wherein the at least one controller is further programmed to operate the display to indicate a reference electric distance traveled that is based on a predetermined target energy consumption rate.

20. The vehicle of claim 19 wherein the at least one controller is further programmed to operate the display such that a position of a first icon, representing the effective electric distance traveled, relative to a position of a second icon, representing the reference electric distance traveled, is based on a difference between the reference electric distance traveled and the effective electric distance traveled.

* * * * *